United States Patent
Laplume et al.

(10) Patent No.: US 11,385,868 B2
(45) Date of Patent: Jul. 12, 2022

(54) ORTHOGONAL PATH RENDERER FOR NATURAL LOOKING SEQUENCE FLOWS

(71) Applicant: Oracle International Corporation, Redwood Shores, CA (US)

(72) Inventors: Nicolas Laplume, Belmont, CA (US); Javier Espeche, Foster City, CA (US); Pablo Schmid, Foster Ctiy, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/127,743

(22) Filed: Dec. 18, 2020

(65) Prior Publication Data

US 2021/0149646 A1    May 20, 2021

Related U.S. Application Data

(63) Continuation of application No. 15/425,703, filed on Feb. 6, 2017, now Pat. No. 10,901,701.
(Continued)

(51) Int. Cl.
*G06F 8/34* (2018.01)
*G06T 11/20* (2006.01)
*G06F 3/04845* (2022.01)
(Continued)

(52) U.S. Cl.
CPC ............ *G06F 8/34* (2013.01); *G06F 3/04845* (2013.01); *G06F 8/38* (2013.01); *G06Q 10/067* (2013.01); *G06T 11/206* (2013.01)

(58) Field of Classification Search
CPC . G06F 8/34; G06F 8/38; G06F 3/0484; G06F 3/04845; G06Q 10/067; G06T 11/20; G06T 11/203; G06T 11/206
(Continued)

(56) References Cited

U.S. PATENT DOCUMENTS 5,278,951 A  *  1/1994  Camacho ................. G06T 1/00
                                                                 345/440
6,802,049 B2 * 10/2004  Teig ...................... G06F 30/394
                                                                 716/124
(Continued)

FOREIGN PATENT DOCUMENTS

CN        103473265 A  * 12/2013
GB         2466344 A  *  6/2010  ............. G06Q 10/06
(Continued)

OTHER PUBLICATIONS

Takahashi et al., "Optimal rectilinear drawing of a graph whose vertices are fixed on a plane", IEEE International Symposium on Circuits and Systems, vol. 1, pp. 315-318, 1990. (Year: 1990).*

*Primary Examiner* — Reza Nabi
*Assistant Examiner* — Hwei-Min Lu
(74) *Attorney, Agent, or Firm* — Trellis IP Law Group, PC

(57) ABSTRACT

Implementations generally relate to rendering orthogonal lines in a sequence flow. In some implementations, a method includes determining, in a user interface of a client device, a first location of a first process node of a process and a second location of a second process node of the process. The method further includes determining, in the user interface, a control location of a control point for a sequence flow process element. The method further includes placing an orthogonal line between the first location and the second location, wherein the orthogonal line is selected from a plurality of predetermined orthogonal lines based on the control location, the first location, and the second location.

14 Claims, 11 Drawing Sheets

Related U.S. Application Data

(60) Provisional application No. 62/395,380, filed on Sep. 16, 2016, provisional application No. 62/395,341, filed on Sep. 15, 2016.

(51) Int. Cl.
*G06F 8/38* (2018.01)
*G06Q 10/06* (2012.01)

(58) Field of Classification Search
USPC .................................................. 715/854
See application file for complete search history.

(56) References Cited

U.S. PATENT DOCUMENTS

| | | | | |
|---|---|---|---|---|
| 7,580,911 B2 * | 8/2009 | Sun | ...................... | G06Q 10/103 |
| | | | | 706/50 |
| 2003/0192021 A1 * | 10/2003 | Teig | ...................... | G06F 30/394 |
| | | | | 716/124 |
| 2008/0184231 A1 * | 7/2008 | Dreiling | ................. | G06Q 10/06 |
| | | | | 718/100 |
| 2012/0066662 A1 * | 3/2012 | Chao | ...................... | G06Q 10/06 |
| | | | | 717/104 |
| 2013/0086491 A1 * | 4/2013 | Rodgers | ................ | G06F 40/169 |
| | | | | 715/760 |
| 2013/0167101 A1 * | 6/2013 | Ohtsuka | ................. | G06F 30/394 |
| | | | | 716/129 |
| 2014/0153386 A1 * | 6/2014 | Kim | ...................... | H04W 24/04 |
| | | | | 370/255 |
| 2015/0261400 A1 * | 9/2015 | Pulkeri | ................. | G06F 3/0484 |
| | | | | 715/763 |
| 2016/0078662 A1 * | 3/2016 | Herman | .................. | A63F 13/52 |
| | | | | 345/473 |

FOREIGN PATENT DOCUMENTS

| | | | | |
|---|---|---|---|---|
| JP | 2013206020 A | * 10/2013 | | |
| WO | WO-9815918 A1 | * 4/1998 | ............ | G06T 11/206 |

\* cited by examiner

100

ORTHOGONAL PATH RENDERER FOR NATURAL LOOKING SEQUENCE FLOWS

CROSS REFERENCES TO RELATED APPLICATIONS

This application is a continuation of U.S. patent application Ser. No. 15/425,703, entitled ORTHOGONAL PATH RENDERER FOR NATURAL LOOKING SEQUENCE FLOWS, filed Feb. 6, 2017 (Trellis ref ORACP0161/Client ref. ORA170290-US-NP), which claims priority from U.S. Provisional Patent Application Ser. No. 62/395,380, entitled ORTHOGONAL PATH RENDERER FOR NATURAL LOOKING SEQUENCE FLOWS, filed on Sep. 16, 2016 (Trellis ref ORACP0161P/Client ref. ORA170290-US-PSP), and U.S. Provisional Patent Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Conventional processes may be displayed with unnatural looking orthogonal line between nodes. Such orthogonal lines may have many breaks and may twist and cross themselves.

SUMMARY

Implementations described herein generally relate to rendering orthogonal lines in a sequence flow. In some embodiments, a non-transitory computer-readable storage medium carries one or more sequences of program instructions thereon. When executed by one or more processors, the instructions cause the one or more processors to perform operations including determining, in a user interface of a client device, a first location of a first process node of a process and a second location of a second process node of the process; determining, in the user interface, a control location of a control point for a sequence flow process element; and placing an orthogonal line between the first location and the second location, where the orthogonal line is selected from a plurality of predetermined orthogonal lines based on the control location, the first location, and the second location.

With further regard to the computer-readable storage medium, in some implementations, the orthogonal line is selected from a table that contains the plurality of predetermined orthogonal lines based on the location of the control point relative to the first location and the second location. In some implementations, the instructions when executed further cause the one or more processors to perform operations including determining a path for the orthogonal line that contains a least number of lines and a least number of corners. In some implementations, the instructions when executed further cause the one or more processors to perform operations including determining a path for the orthogonal line with a shortest possible distance between the first location and the second location. In some implementations, the instructions when executed further cause the one or more processors to perform operations including placing the orthogonal line between the first location and the second location based on relative positions of the first location and the second location. In some implementations, the orthogonal line passes through the control point. In some implementations, the orthogonal line starts at a center of the first location and ends at a center of the second location.

In some implementations, a method includes determining, in a user interface of a client device, a first location of a first process node of a process and a second location of a second process node of the process; determining, in the user interface, a control location of a control point for a sequence flow process element; and placing an orthogonal line between the first location and the second location, where the orthogonal line is selected from a plurality of predetermined orthogonal lines based on the control location, the first location, and the second location.

With further regard to the method, in some implementations, the orthogonal line is selected from a table that contains the plurality of predetermined orthogonal lines based on the location of the control point relative to the first location and the second location. In some implementations, the method further includes determining a path for the orthogonal line that contains a least number of lines and a least number of corners. In some implementations, the method further includes determining a path for the orthogonal line with a shortest possible distance between the first location and the second location. In some implementations, the method further includes placing the orthogonal line between the first location and the second location based on relative positions of the first location and the second location. In some implementations, the orthogonal line passes through the control point. In some implementations, the orthogonal line starts at a center of the first location and ends at a center of the second location.

In some implementations, an apparatus includes one or more processors, and includes logic encoded in one or more non-transitory computer-readable storage media for execution by the one or more processors. When executed, the logic is operable to perform operations including determining, in a user interface of a client device, a first location of a first process node of a process and a second location of a second process node of the process; determining, in the user interface, a control location of a control point for a sequence flow process element; and placing an orthogonal line between the first location and the second location, where the orthogonal line is selected from a plurality of predetermined orthogonal lines based on the control location, the first location, and the second location.

With further regard to the apparatus, in some implementations, the orthogonal line is selected from a table that contains the plurality of predetermined orthogonal lines based on the location of the control point relative to the first location and the second location. In some implementations, the logic when executed is further operable to perform operations including determining a path for the orthogonal line that contains a least number of lines and a least number of corners. In some implementations, the logic when executed is further operable to perform operations including determining a path for the orthogonal line with a shortest possible distance between the first location and the second location. In some implementations, the logic when executed is further operable to perform operations including placing the orthogonal line between the first location and the second location based on relative positions of the first location and the second location. In some implementations, the orthogonal line passes through the control point.

A further understanding of the nature and the advantages of particular embodiments disclosed herein may be realized by reference of the remaining portions of the specification and the attached drawings.

DETAILED DESCRIPTION OF EMBODIMENTS

Figure 1:
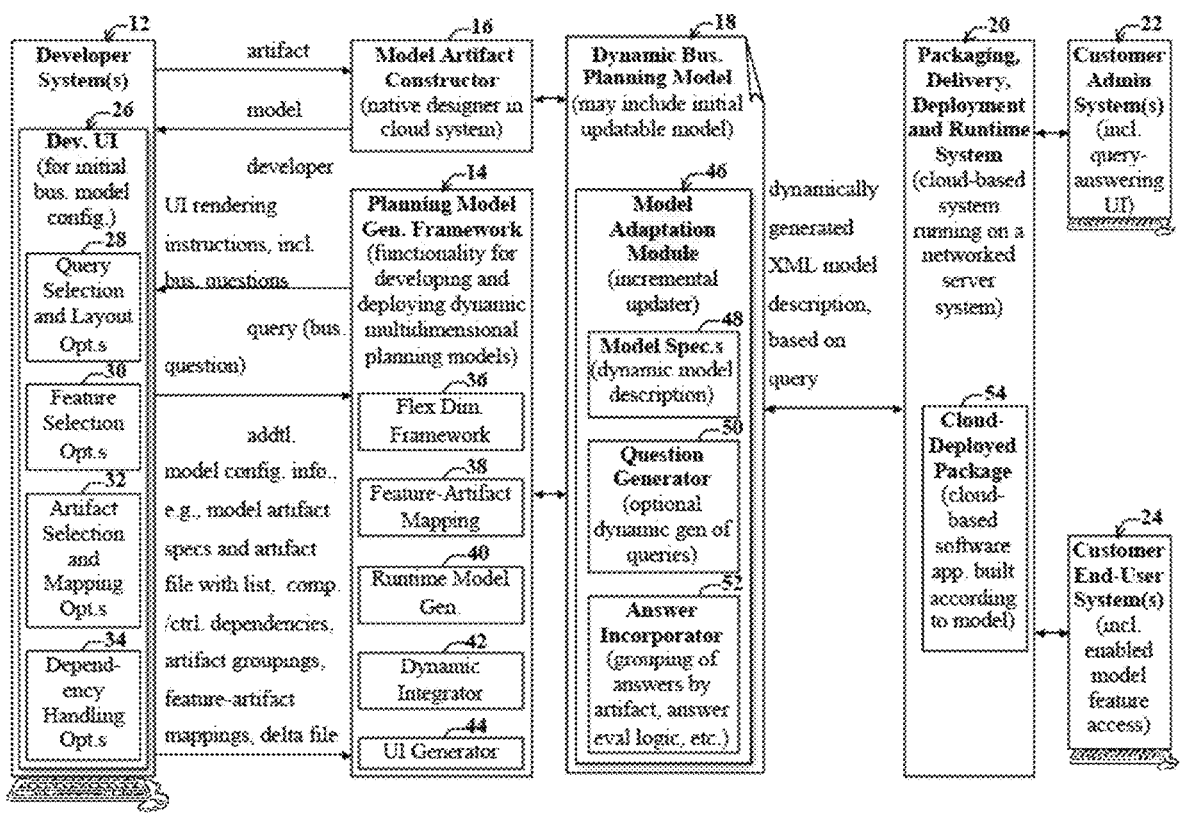
FIG. 1 illustrates an example block diagram of a system, which may be used for implementations described herein.

Implementations described herein generally relate to rendering orthogonal lines in a sequence flow. In various implementations, an algorithm determines the most natural looking orthogonal line between start and end nodes of a process, passing through a control point. The most natural looking line is one that will have the least amount of breaks, and does not twist crossing with itself. This is achieved by dividing the canvas into a predetermined number of sectors (e.g., 9 sectors), and choosing the most appropriate sectors, according to the position of the control point, and the positions of the start and end nodes.

In some implementations, a method includes determining, in a user interface of a client device, a first location of a first process node and a second location of a second process node. The method further includes determining, in the user interface, a control location of a control point. The method further includes placing an orthogonal line between the first location and the second location based on the control location, the first location, and the second location.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package").

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System(s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42, and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "System(s)," as discussed more fully below.

Packaging, delivery, deployment, and runtime system 20 hosts and runs deployed cloud-based software package or application 54, also referred to as "cloud-deployed package" 54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen (an examples of which are shown in FIGS. 3, 4, 5, 7, 8, and 9) that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers. The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation facilitates and substantially reduces the need for customers to configure and/or update business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices.

Furthermore, as best practices change, dynamic business planning model 18 may adapt to comply with the new best practices.

Figure 2:
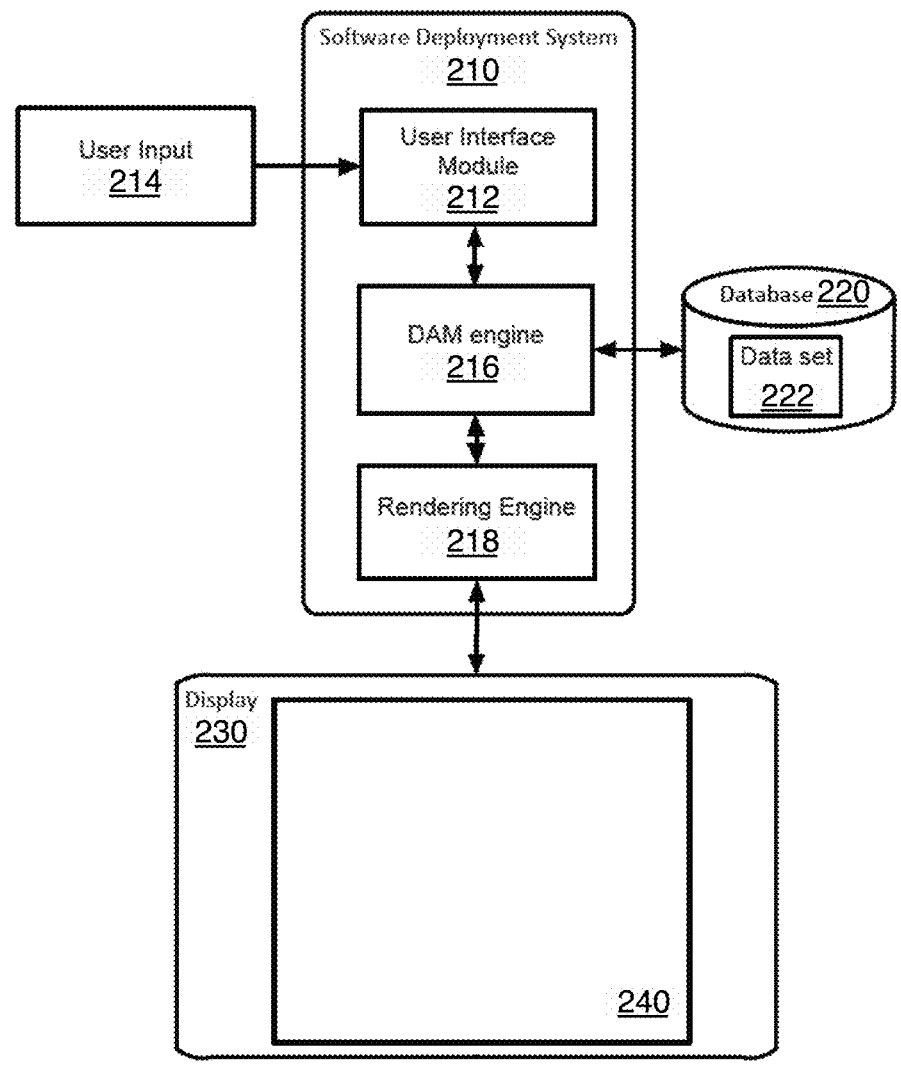
FIG. 2 illustrates an example block diagram of a computing system, which may be used for implementations described herein.

FIG. 2 illustrates an example block diagram of a computing system 200, which may be used for implementations described herein. Computing system 200 provides an interface layer, such as an application program interface (API). The interface layer provides users with seamless connectivity between different instantiations of an application located in different environments (e.g., development environment, production environment, etc.). Computing system 200 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 200 may include a data source such as database 220. Database 220 may be connected to the software management system 210 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 220 may contain one or more data sets 222. Data sets 222 may include data as described herein. Data sets 222 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 222 may also contain other data, data elements, and information such as metadata, labels, development-time information, run-time information, configuration information, API, interface component information, library information, pointers, and the like.

In various implementations, software management system 210 is connected to a display 230 configured to display data 240 (e.g., graphical data, etc.), for example, to a user thereof. Display 230 may be a passive or an active display, adapted to allow a user to view and interact with display data 240 displayed thereon, via user interface 214. In other configurations, display 230 may be a touch screen display responsive to touches, gestures, swipes, and the like for use in interacting with and manipulating display data 240 by a user thereof. Gestures may include single gestures, multi-touch gestures, and other combinations of gestures and user inputs adapted to allow a user to convert, model, generate, deploy, and maintain display data 240.

In various implementations, process engine 216 may be adapted to receive data from user interface 214 and/or database 220 for processing thereof. In one configuration, process engine 216 is a software engine configured to receive and process input data from a user thereof pertaining to display data 240 from user interface 214 and/or database 220 in order to provide the process API layer.

Process engine 216 in other implementations may be configured as a data analysis tool to perform analysis functions associated with display data 240. Such analysis functions may include determining attributes associated with the data, partitions, local and remote pods (layers), communication protocols, determining the relationships to other data, interpreting metadata associated with the data, and the like. For example, process engine 216 may be configured to receive and analyze data sets 222 to determine user interface configuration, data processing instructions, data attributes, data hierarchy, nodes, nodal positions within the hierarchy, values, summations, algorithms, source, security, hashes, and the like, associated with data sets 222.

Process engine 216 may receive existing data sets 222 from database 220 for processing thereof. Such data sets 222 may include and represent a composite of separate data sets 222 and data elements pertaining to, for example, organizational data, which may include employment data, salary data, personnel data, and the like. In addition, data sets 222 may include other types of data, data elements, and information such as contact data, sales data, production data, scientific data, financial data, medical data, census data, and the like.

Rendering engine 218 may be configured to receive configuration data pertaining to display data 240, associated data sets 222, and other data associated with display data 240 such as user interface components, icons, user pointing device signals, and the like, used to render display data 240 on display 230. In one exemplary implementation, rendering engine 218 may be configured to render two-dimensional (2D) and three-dimensional (3D) graphical models and simulations to allow a user to obtain more information about data sets 222. In one implementation, upon receiving instruction from a user, for example, through user interface 214, rendering engine 218 may be configured to generate a real-time display of interactive changes being made to display data 240 by a user thereof.

Note that the computing system 200 presents a particular example implementation, where computer code for implementing embodiments may be implemented, at least in part, on a server. However, embodiments are not limited thereto. For example, a client-side software application may implement software management system 210, or portions thereof, in accordance with the present teachings without requiring communications between the client-side software application and a server.

Figure 3:
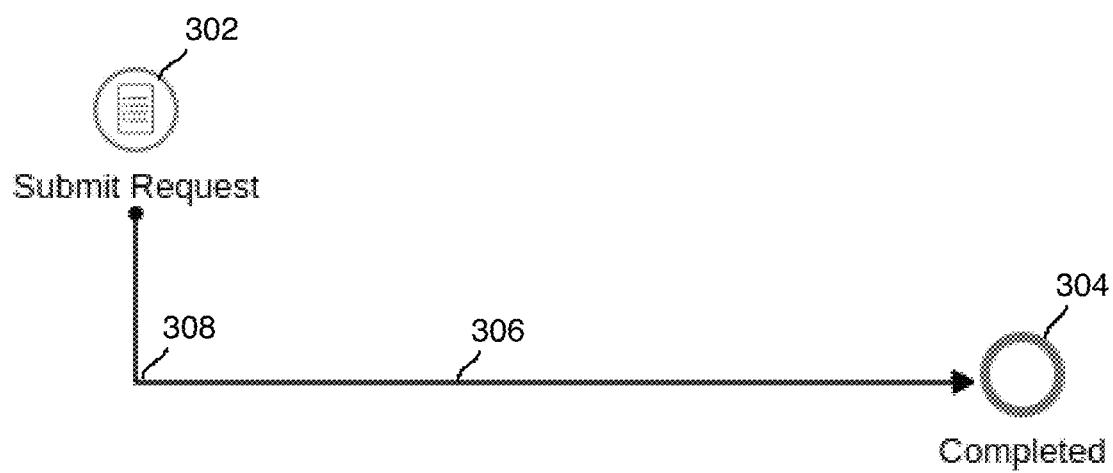
FIG. 3 illustrates an example user interface including a natural looking process sequence flow, according to some implementations.

FIG. 3 illustrates an example user interface including a natural looking process sequence flow 300, according to some implementations. Shown are process nodes 302 and 304 and an orthogonal line 306. In various implementations, process nodes 302 and 304 represent process elements that perform certain functions in a process such as a business process. For example, in some implementations, human task process elements represent human or user tasks or interactions with a process. For example, in some implementations, a human task process element may represent a user such as a loan applicant submitting a loan application, where the system receives the loan application. System task process elements represent system actions or tasks. For example, the system may post an item in a social network. In another example, the system may update a human resources database, update an external system, etc. Event process elements represent events that occur during a process. For example, an event may be an occurrence of a loan application being approved or not approved. Gateway process elements represent the process path determinations. For example, gateway process elements may function to split or merge paths. Process nodes 302 and 304 may also be referred to as process elements or process flow nodes.

In various implementations, process sequence flow 300 may be one of several or one of many sequence flows, where a sequence flow is a series of process elements in a process connected by sequence flow process elements. Each sequence flow has a directional flow determined by the sequence flow process element.

In various implementations, orthogonal line 306 represents sequence flow process element, which represent a connection between process elements. In various implementations, where such connections are directional (e.g., indicated with arrows). In other words, a sequence flow process element generates a process path that flows in a particular direction from one process element to another process element.

Orthogonal line 306 has one corner 308. Orthogonal line 306 starts at process node 302 and ends at process node 304, connecting process nodes 302 and 304. Orthogonal line 306 may also be referred to as an orthogonal path and includes all line segments between process nodes 302 and 304.

In various implementations, orthogonal line 306 functions to define some behavioral aspects of the process. For example, orthogonal line 306 defines a connection of flow elements such as process nodes 302 and 304. Orthogonal line 306 also defines a direction of flow between flow elements such as process nodes 302 and 304. Orthogonal line 306 may be referred to as a sequence flow type of process element.

As described in more detail herein, there are multiple possible paths between process nodes 302 and 304. Implementations render an orthogonal line 306 that joins process nodes 302 and 304 while having the least number of possible lines and the least number of possible corners or breaks.

Figure 4:
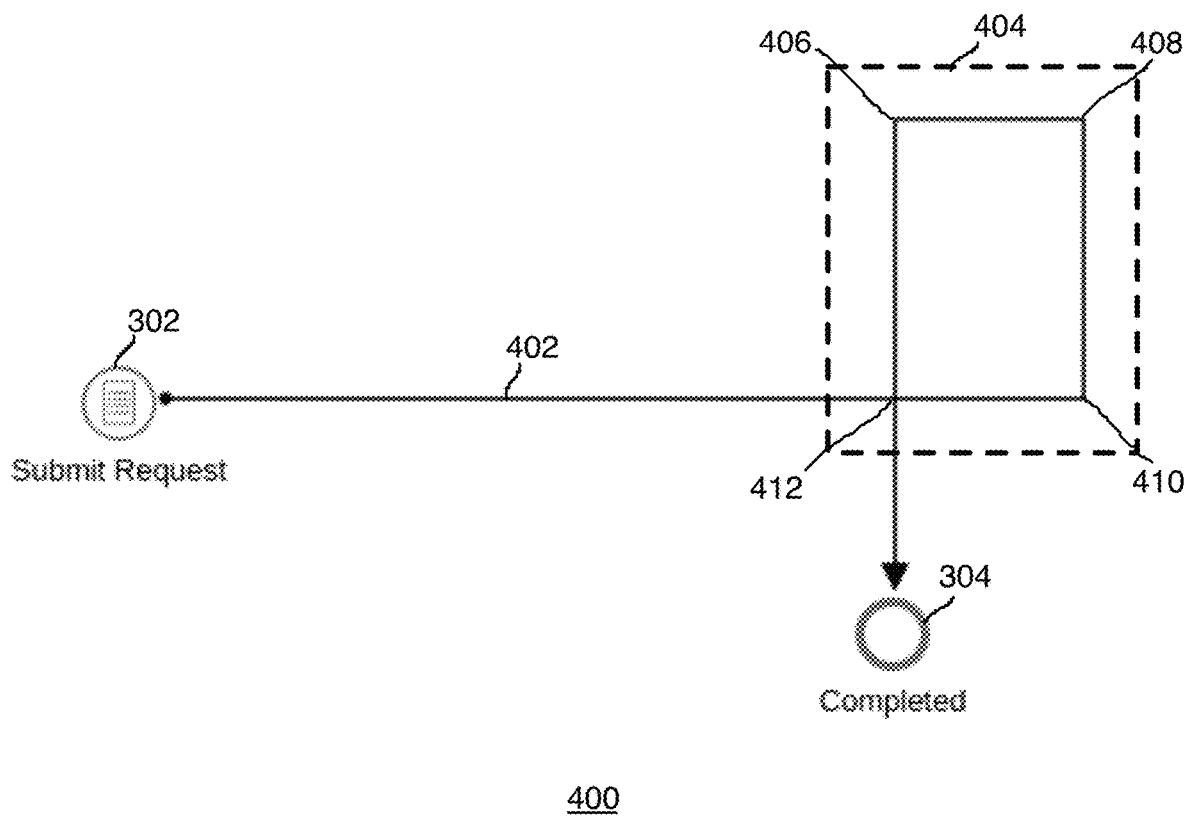
FIG. 4 illustrates an example user interface including an unnatural looking process sequence flow.

FIG. 4 illustrates an example user interface including an unnatural looking process sequence flow 400. Shown are process nodes 302 and 304 and an orthogonal line 402. Orthogonal line 402 has an undesired or unnatural portion 404. As shown, portion 404 contains corners 406, 408, 410, and 412. Also, lines at corner 412 cross.

Figure 5:
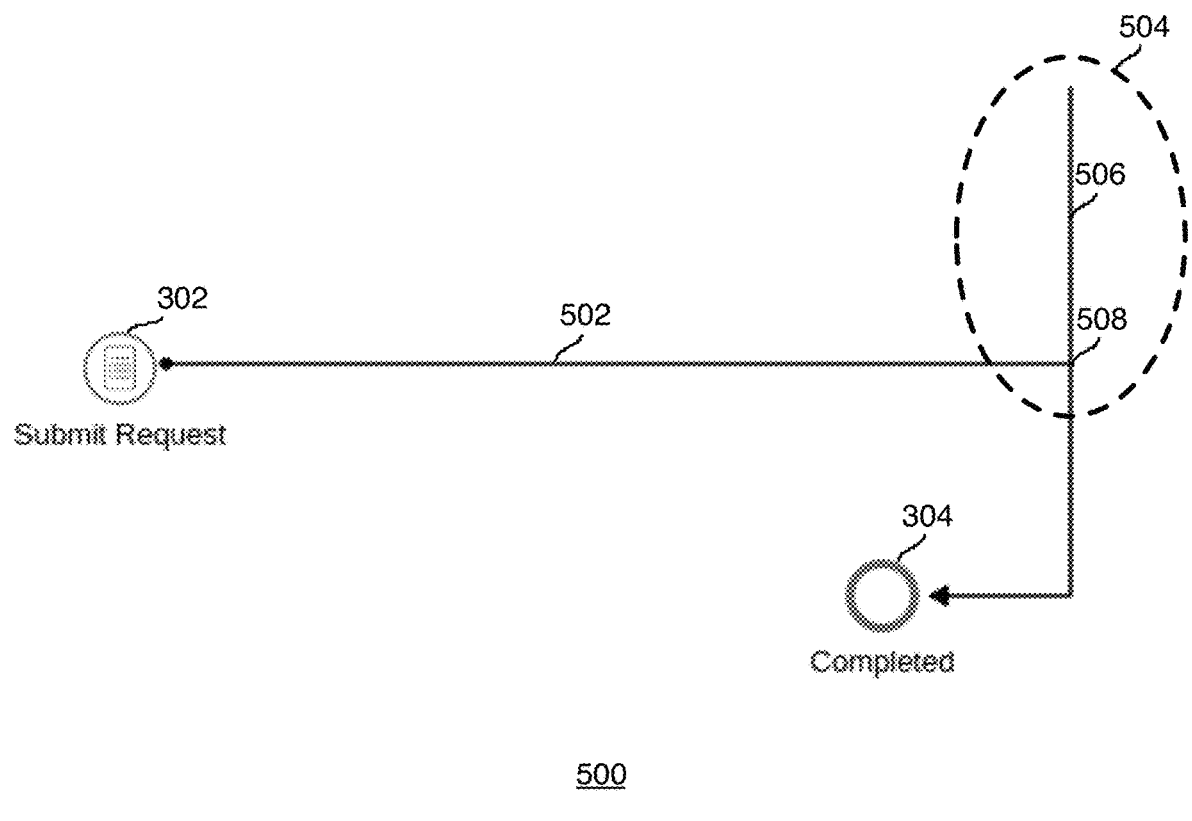
FIG. 5 illustrates an example user interface including an unnatural looking process sequence flow.

FIG. 5 illustrates an example user interface including an unnatural looking process sequence flow 500. Shown are process nodes 302 and 304 and an orthogonal line 502. Orthogonal line 502 has an undesired or unnatural portion 504. As shown, portion 504 contains a stray line segment 506 and corner 508.

Figure 6:
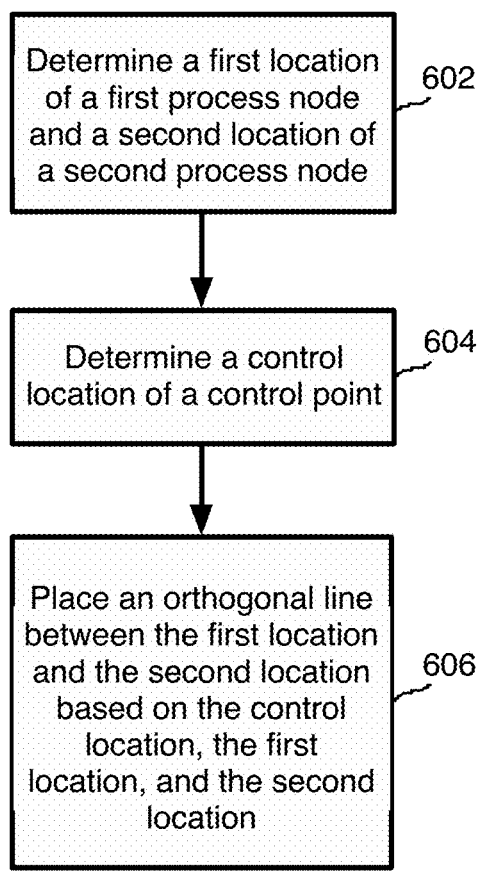
FIG. 6 illustrates an example flow diagram for rendering orthogonal lines in a natural looking sequence flow, according to some implementations.

FIG. 6 illustrates an example flow diagram for rendering orthogonal lines in a natural looking sequence flow, according to some implementations. A method is initiated at block 602, where a system such as a client device determines, in a user interface of the client device, the location of a first process node such as process node 302 in a process and a location of a second process node such as process node 304 in the process. In various implementations, the location of the first process node and the second process node are determined by a user. For example, in some implementations, the system may enable the user drag and drop the first process node and the second process node in a workspace in the user interface. The user may position the process nodes in desired positions in a process. In various implementations, developer computer system 12 of FIG. 1 enables a user such as a developer user to select and place process nodes and sequence flow process elements into a workspace of a user interface.

Figure 7:
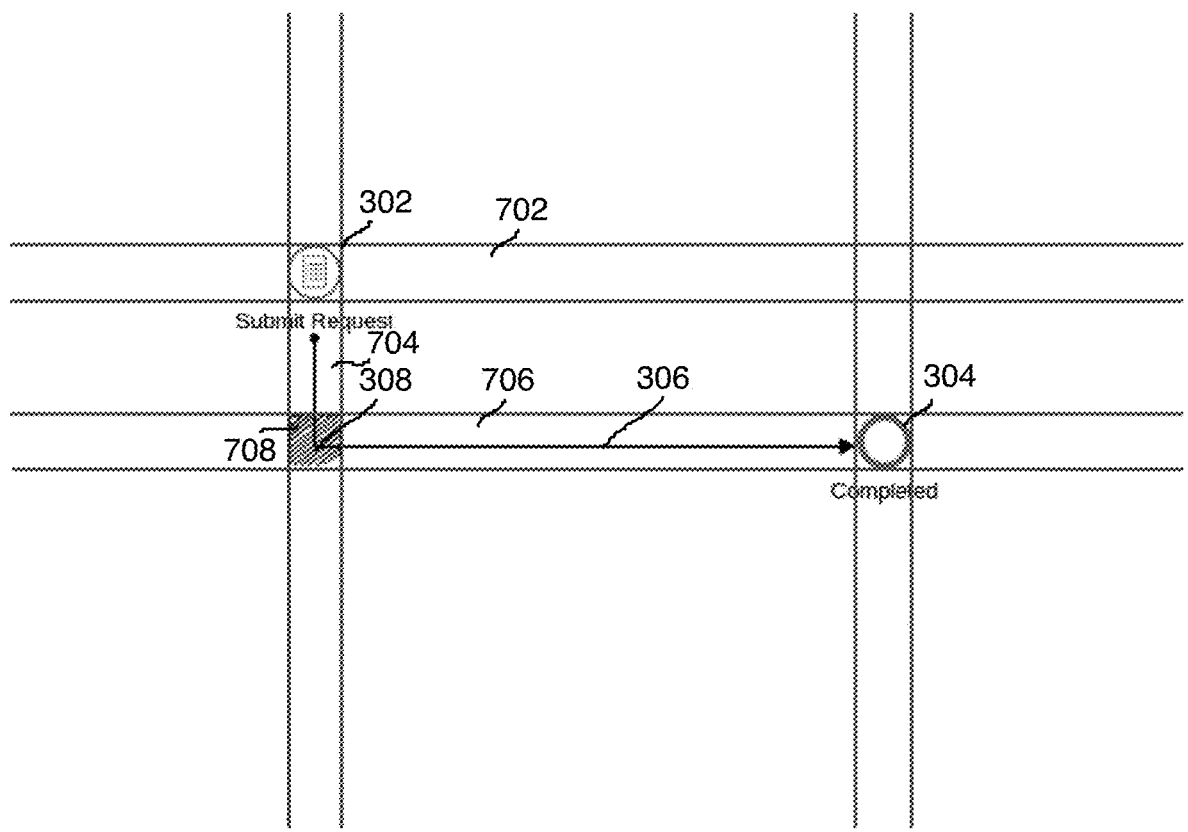
FIG. 7 illustrates an example user interface including a natural looking process sequence flow and line segments, according to some implementations.

FIG. 7 illustrates an example user interface including a natural looking process sequence flow 700 and line segments, according to some implementations. Shown are process nodes 302 and 304 and an orthogonal line 306, as also shown in FIG. 3. Orthogonal line 306 has one corner 308. Also shown are sectors or regions 702, 704, 706, and 708. In various implementations, the regions, sizes and locations are predetermined. The regions may have different sizes from each other.

In various implementations, the system determines the locations of process nodes 302 and 304 in the user interface, and determines which regions contain process node 302 and process node 304.

At block 604, the system determines, in the user interface, a control location of a control point for a sequence flow process element. In some implementations, the system determines the location of the control point in the user interface, and determines which regions contain the control point. In various implementations, the location of the control location is determined by the user. For example, in some implementations, the system may enable the user drag and drop the sequence flow process element into the workspace in the user interface. The user may position the sequence flow process element in desired positions in a process, typically between two process nodes that the user intends to connect. In various implementations, the system automatically creates the orthogonal line, placing line segments of the orthogonal line in optimal positions. More specifically, as indicated herein, the system selects from multiple predetermined orthogonal lines based the location of the control point and the locations of the process nodes.

Figure 8:
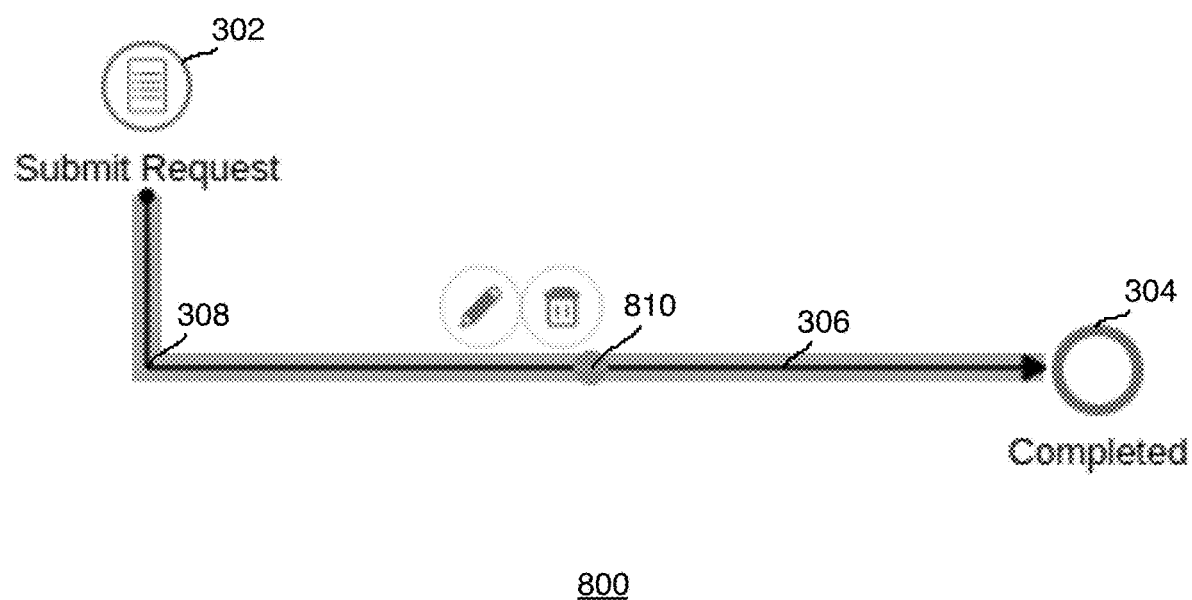
FIG. 8 illustrates an example user interface including a natural looking process sequence flow including a control point, according to some implementations.

FIG. 8 illustrates an example user interface including a natural looking process sequence flow 800 including a control point, according to some implementations. Shown are process nodes 302 and 304 and an orthogonal line 306, as also shown in FIG. 3. Orthogonal line 306 has one corner 308. Also shown is a control point 810.

In some implementations, control point 810 is a point on the orthogonal line that the user can control or move. The control point may be a circle or other shape or other visual indication. In some implementations, if the user moves the control point (e.g., using a mouse or touch pad, etc.), the line segments of the orthogonal line follow the control point, staying connected to the control point, where the line segments may change in length and position while the ends of the orthogonal line stay connected to the process nodes. As described in more detail herein, the system automatically places an orthogonal line such that it has the least number of line segments and least number of bends. FIG. 3 shows an example orthogonal line having a desired shape. FIGS. 4 and 5 show example orthogonal lines undesired shapes.

While implementations are described herein in the context of an orthogonal line having one control point, in some implementations, an orthogonal line may have two or more control points, depending on the implementation.

At block 606, the system places an orthogonal line between the location of the first process node (e.g., process node 302) and the location of the second process node (e.g., process node 304), where the orthogonal line is selected from a plurality of predetermined orthogonal lines based on the location of the control point (e.g., control point 810), the location of the first process node, and the location of the second process node. In various implementations, the orthogonal line is selected from a table that contains the predetermined orthogonal lines based on the location of the control point relative to the first location and the second location. Example implementations of the table are described in more detail below. In various implementations, planning model generation framework 14 of FIG. 1 and/or software deployment system 210 of FIG. 2 causes process sequence flow 300 to be displayed in the user interface.

In various implementations, the orthogonal line passes through the control point. For example, orthogonal line 306 passes through control point 810. Also, in various implementations, the orthogonal line includes multiple line segments. For example, orthogonal line 306 has two line segments, one line segment extending from process node 302 to control point 810, and one line segment extending from control point 810 to process node 304.

There are multiple possible paths for the orthogonal line between the first process node and the second process node. In various implementations, the system determines a path for the orthogonal line that contains the least number of lines and least number of corners or breaks. For example, in some implementations, the system determines a path for the orthogonal line that contains a number of line segments that is less than a line segment number threshold and a number of corners that is less than a corner number threshold. For example, if segment number threshold is 2, the system would determine a path where the orthogonal line has only one line segment. If segment number threshold is 3, the system would determine a path where the orthogonal line has 1 or 2 line segments. If possible, the system would select the orthogonal line with the fewest number of line segments.

In another example, if corner number threshold is 2, the system would determine a path where the orthogonal line has only one corner. If corner number threshold is 3, the system would determine a path where the orthogonal line has one or two corners. If possible, the system would select the orthogonal line with the fewest number of corners. The particular segment number threshold and corner number threshold will depend on the particular implementation.

In some implementations, the system determines the path for the orthogonal line with the shortest possible distance between the first node and the second node. In some implementations, the system determines a path for the orthogonal line with a distance between the first location and the second location that is less than a distance threshold. For example, the system may determine orthogonal lines that have the fewest number of line segments and the fewest number of corners (e.g., 2 line segments and 1 corner). Among those orthogonal lines, the system may select the orthogonal line with the shortest line segments, or where the sum of lengths of the line segments is the smallest.

In some implementations, the system places the orthogonal line between the first node and the second node based on the relative positions of the first node and the second node. In some implementations, the system determines the relative positions of the first and second nodes. In some implementations, the system determines if the relative position of the first node to the second node is left-to-right and from up-to-down. If both, the system maintains their positions.

If the relative position of the first node to the second node is not left-to-right but instead right-to-left, the system redraws the process flow or more specifically repositions the first node and second node in their horizontal mirror image such that they are left-to-right.

If the relative position of the first node to the second node is not left-to-right but instead up-to-down, the system temporarily repositions the first node and second node in their vertical mirror image such that they are left-to-right. In other words, in some implementations, the target relative position is for the first process node to be in the upper left relative to the second process node, where the direction of the flow goes from the first process node to the second process node. Stated differently, the target relative position is for the second process node to be in the lower right relative to the first process node, where the direction of the flow goes from the first process node to the second process node.

Once in the proper orientation, after any needed mirroring or transformation, the system applies a table to determine placement of the orthogonal line. In various implementations, each region (e.g., regions 702, 704, 706, and 708 of FIG. 7) has an associated table that indicates the path of the orthogonal line. Each table contains various mappings that indicate different paths of the orthogonal line, depending on where the control point is located in the region. In various implementations, the tables are indexed by regions in the workspace and by the locations of predetermined control points relative to locations of the process nodes and control points in the regions.

The system determines the position of a control point relative to the process nodes. Depending on where the control point is located (e.g., in a particular region), the system applies the table in order to indicate the path of the orthogonal line.

As indicated herein, each table contains various mappings that indicate different paths of the orthogonal line, depending on where the control point is located in the region, and depending on the location of the control point relative to the locations of the process nodes connected at each end of the orthogonal line.

In some implementations, the orthogonal line starts at the center of the first process node and ends at the center of the second process node. A portion of the orthogonal line is hidden by the graphical symbols representing the process nodes. In some implementations, it is possible that a given orthogonal line may have a corner within the graphical symbol representing the process node, where the corner is hidden from view of the user.

In various implementations, for each location in a given region, the mapping in the table for that region has a different combination and order of directional vectors indicated by a letter. For example, in some implementations, an H means horizontal and a V means vertical. Referring to orthogonal line 302 of FIG. 3, and VH indicates that orthogonal line 302 travels from process node 302 vertical then horizontal to process node 304. In various implementations, the default directions are up-to-down and left-to-right. Referring again to FIG. 8, the VH mapping shows a predetermined path that corresponds to the combination of the particular locations of process node 302, process node 304, and control point 810.

In various implementations, each table is a lookup table that contains a code and a string for each code, where each string contains directional vectors. The tables may be stored in various locations, depending on the implementation. For example, the tables may be stored at developer systems 12, planning model generation framework 14, and/or any suitable storage location such as database 220 of FIG. 2, data storage devices 1030 of FIG. 10, and so on.

In some implementations, each table stays the same (does not change), and there are different tables for each combination of possible locations of the first and second process nodes and control points. In some implementations, the orientation of the first and second process nodes may remain the same regardless of their relative positions, and the tables may be reconfigured (e.g., different mirror images of the tables, etc.), which would yield the same results.

In some implementations, there may be a bias for the system to direct the path generally horizontally more than vertically because graphical representations of processes are typically read from left-to-right. As such, in some implementations, for a given orthogonal line, the combined lengths of horizontal line segments of that orthogonal line are greater than combined lengths of vertical line segments of that orthogonal line.

In various implementations, the steps described herein may be implemented by developer computer system 12 of FIG. 1, where the system receives the process element information from another system such as planning model generation framework 14 of FIG. 1. The steps described herein may also be implemented by software deployment system 210 of FIG. 2.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

As indicated above, in various implementations, each table is a lookup table that contains a code and a string for each code, where each string contains directional vectors. In some implementations, each string (e.g., VH) represents the way that an orthogonal line is formed, where the first letter indicates the way the source is connected to the control point, and the second letter indicates the way the control point connects to the target. In some implementations, an H means that the connection is made up of a horizontal line followed by a vertical line, and a V means that the connection is made up of a vertical line followed by a horizontal line.

For example, referring again to FIG. 8, the orthogonal line has a shape corresponding to a string VH. The first letter V corresponds to a connection between a source node (e.g., process node 302) and a control point (e.g., control point 810), where the V indicates a vertical line extending from the source node followed by a horizontal node that connects to the control point. The second letter H corresponds to a connection between the control point (e.g., control point 810) and a target node (e.g., process node 304), where the H indicates horizontal line extending from the control point and connecting to the target node. Note that while H may indicate a horizontal line followed by a vertical line, the system defaults to a straight path when possible, where, in this example implementation, the subsequent vertical line is not needed.

In some implementations, each position in the table represents a different region in the workspace, according to where the control point is located relative to the process nodes. The following are example strings in a table:

[HH, HH, VH, VV, VV]
[VV, HH, VH, VV, VV]
[HV, HV, HV, HV, HV]
[HH, HH, VH, VV, HH]
[HH, HH, VH, VV, VV]

As indicated herein, an orthogonal line is selected from the table that contains the predetermined orthogonal lines based on the location of the control point relative to the first location and the second location. The system selects one of the strings pairs in the table that would result in an orthogonal line that passes through the control point.

Figure 9:
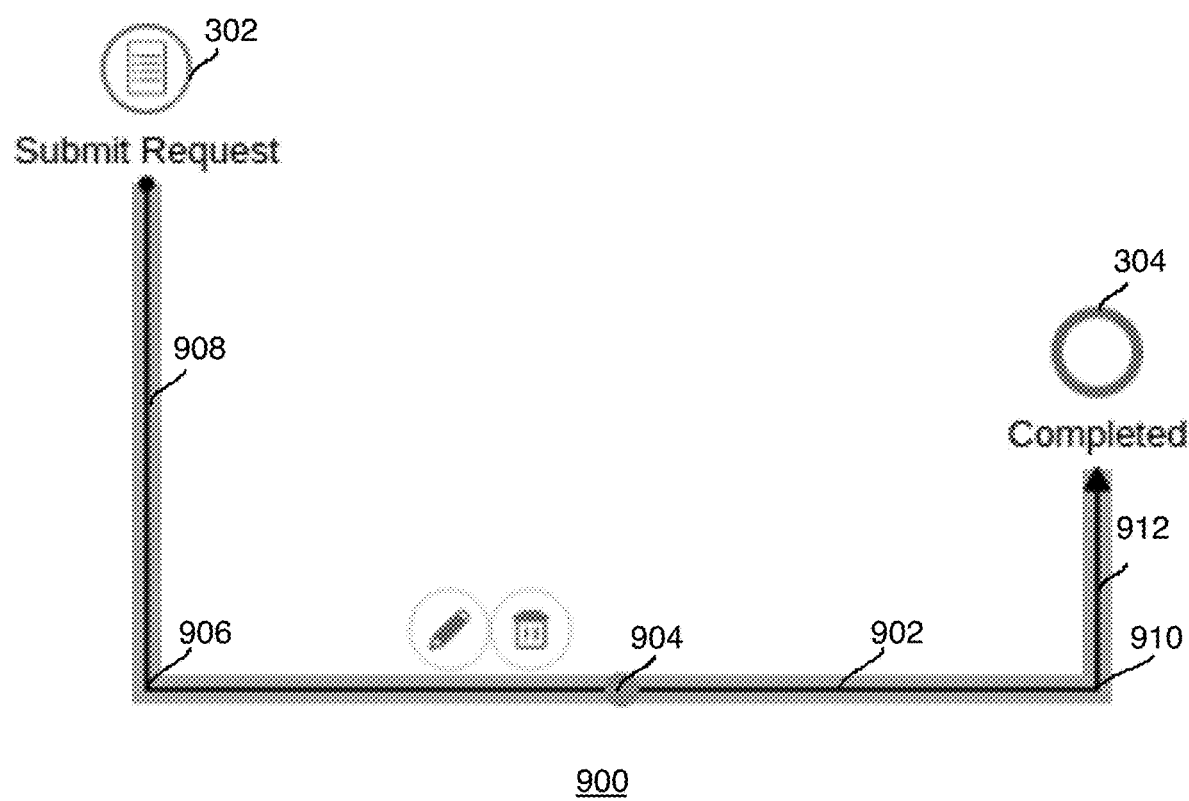
FIG. 9 illustrates an example user interface including a natural looking process sequence flow including a control point, according to some implementations.

FIG. 9 illustrates an example user interface including a natural looking process sequence flow 900 including a control point, according to some implementations. Shown are process nodes 302 and 304 and an orthogonal line 902. Also shown is a control point 904. Orthogonal line 902 has corner 906, a line segment 908, a corner 910, and a line segment 912.

In this example, orthogonal line 902 has a shape corresponding to a string VH. The locations of process nodes 302 and 304 are the same as in FIG. 8, but control point 904 is in a different location than control point 810. As such, a different table is applied, which renders a different, yet natural looking path from process node 302 to process node 304. The first letter V corresponds to a connection between the source node or process node 302 and a control point 904, where the V a indicates vertical line extending from process node 302 followed by a horizontal node that connects to control point 904. The second letter H corresponds to a connection between control point 904 and the target node or process node 304, where the H indicates horizontal line extending from control point 904 followed by a vertical line that connects to process node 304.

For ease illustration, orthogonal lines are described herein in the context of connecting two process nodes. Such two process nodes may be process nodes with the process generally. A given orthogonal line may connect two process nodes from two different sub-processes of the same process. For example, within a given process, a first sub-process may be associated with a first user (e.g., a loan applicant), and a second sub-process may be associated with a second user (e.g., a loan officer). A given orthogonal line may connect two process nodes from different processes or services. For example, a first process may be associated with a first department of a company (e.g., engineering department), and a second process may be associated with a second department of the company (e.g., finance department).

While implementations are described herein in the context the user moving the control point, in some implementation, the system automatically places the orthogonal line in the optimal position without touching the control point. As such, the control point may be in a default position and the system may still determine the location of the control point and select an orthogonal line accordingly.

Figure 10:
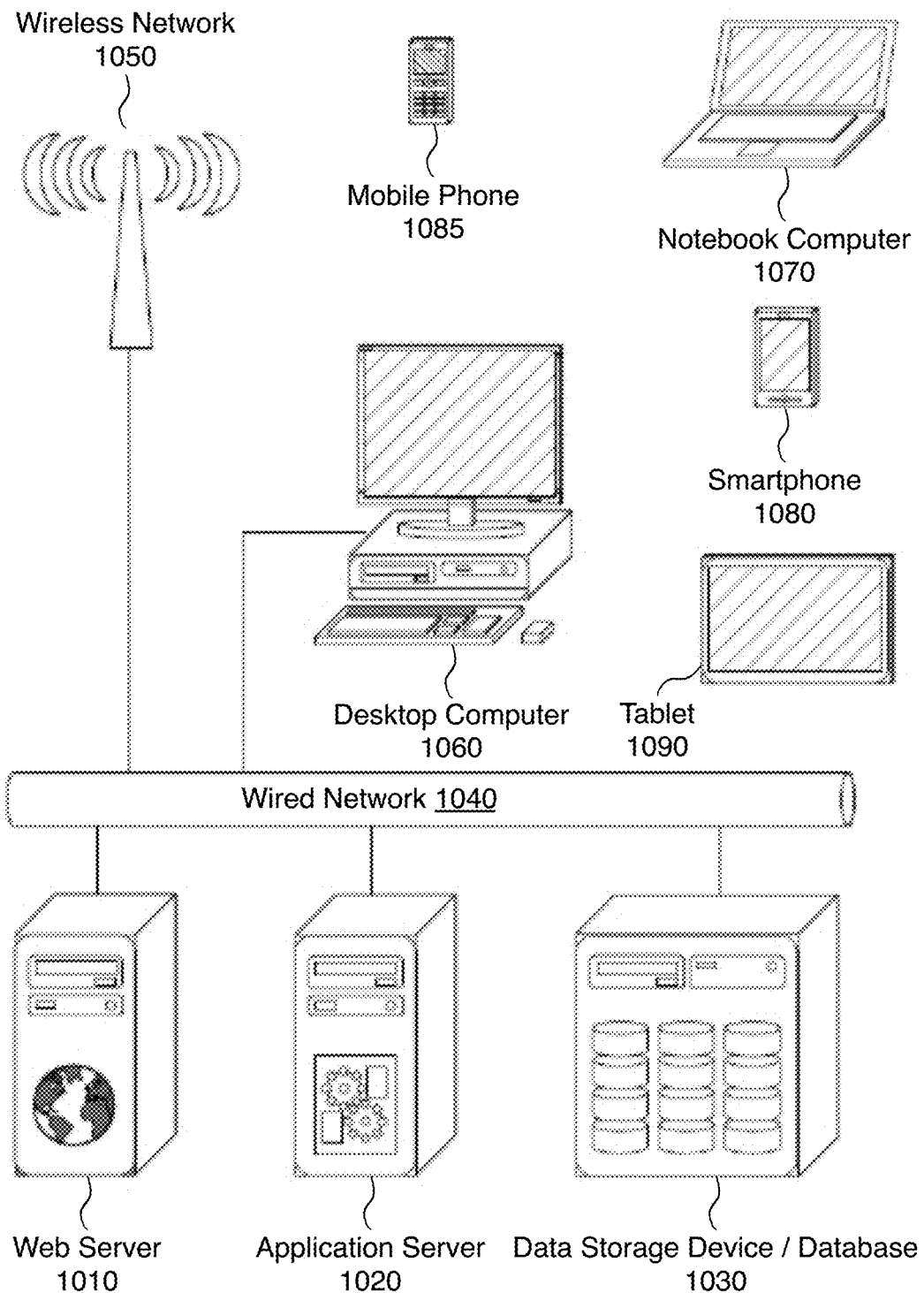
FIG. 10 illustrates an example block diagram of a system, which may be used for implementations described herein.

FIG. 10 illustrates an example block diagram of a system 1000, which may be used for implementations described herein. Example system 1000 is capable of supporting or running various hardware and/or software modules and associated methods discussed with reference to FIGS. 1-9. Note that certain implementations may be implemented using one or more standalone applications (for example, residing in a user device) and/or one or more web-based applications implemented using a combination of client-side and server-side code. While system 1000 performs implementations described herein, in other implementations, any suitable component or combination of components associated with system 1000 or any suitable processor or processors associated with system 1000 may facilitate performing the implementations described herein. In various implementations, system 1000 may not have all of the components shown and/or may have other elements including other types of components instead of, or in addition to, those shown herein.

General system 1000 includes user devices 1060-1090, including one or more desktop computers 1060, one or more notebook computers 1070, one or more smart-phones 1080, one or more mobile phones 1085, and one or more tablets 1090. General system 1000 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1000 is shown with five user devices, any number of user devices can be supported.

A web server 1010 is used to process requests from web browsers and standalone applications for web pages, electronic documents, enterprise data or other content, and other data from the user computers. Web server 1010 may also provide push data or syndicated content, such as RSS feeds, of data related to enterprise operations.

An application server 1020 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1020 are adapted to process input data and user computer requests and can store or retrieve data from data storage device or database 1030. Database 1030 stores data created and used by the data applications. In some implementations, database 1030 includes a relational database that is adapted to store, update, and retrieve data in response to SQL format commands or other database query languages. Other implementations may use unstructured data storage architectures and Not Only SQL (NoSQL) databases.

In some implementations, application server 1020 includes one or more general-purpose computers capable of executing programs or scripts. In some implementations, web server 1010 is implemented as an application running on the one or more general-purpose computers. Web server 1010 and application server 1020 may be combined and executed on the same computers.

An electronic communication network 1040-1050 enables communication between user computers 1060-1090, web server 1010, application server 1020, and database 1030. In some implementations, networks 1040-1050 may further include any form of electrical or optical communication devices, including wired network 1040 and wireless network 1050. Networks 1040-1050 may also incorporate one or more local-area networks, such as an Ethernet network, wide-area networks, such as the Internet; cellular carrier data networks; and virtual networks, such as a virtual private network.

System 1000 is one example for executing applications according to some implementations. In some implementations, application server 1010, web server 1020, and optionally database 1030 can be combined into a single server computer application and system. In further implementations, virtualization and virtual machine applications may be used to implement one or more of application server 1010, web server 1020, and database 1030.

In still further implementations, all or a portion of the web and application serving functions may be integrated into an application running on each of the user computers. For example, a JavaScript application on the user computer may be used to retrieve or analyze data and display portions of the applications.

In various implementations, system 1000 may not have all of the components shown and/or may have other elements including other types of components instead of, or in addition to, those shown herein.

With reference to FIGS. 1, 2, and 10, developer system(s) 12, customer administrator system(s) 22, and customer end-user system(s) 24 of FIG. 1 may be implemented in whole or in part via one or more of desktop computer 1060, notebook computer 1070, smartphone 1080, mobile phone 1085, and tablet 1090 of FIG. 10 and/or other computing devices such as computing system 200 of FIG. 2. In some implementations, computing devices 1060-1090 run browsers, e.g., used to display developer UI(s) 26 and UIs of customer administrator system(s) 22 and customer end-user system(s) 24 of FIG. 1. Examples of such UIs are shown in FIGS. 3, 4, 5, 7, 8, and 9.

In some implementations, browsers of systems 12, 22, 24 of FIG. 1 connect to the Internet, represented by wired network 1040 and/or wireless network 1050 as shown in FIG. 10, to access one or more network-coupled servers, databases, and/or associated cloud-based functionality, as represented by modules 14-20 of FIG. 1. Note that one or more of web server 1010, application server 1020, and data storage device or database 1030 shown in FIG. 10 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 1010, application servers 1020, and data storage devices 1030 shown in FIG. 10.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 1030 of FIG. 10 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 1030 of FIG. 10 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 1030 of FIG. 10 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 1010 of FIG. 10 and supporting application code of application server 1020 of FIG. 10, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens (examples of which are shown in FIGS. 3, 4, 5, 7, 8, and 9) include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 1010 shown in FIG. 10 to access websites and accompanying webpage code, which is backed by applications used to implement modules 16-20 of FIG. 1. The webpage code of web servers 1010 of FIG. 10 uses web services, APIs, and/or other interfacing mechanisms to communicate with application software hosted on application servers 1020 of FIG. 10 of the cloud, which includes a collection of web servers 1010, application servers 1020, and data storage devices 1030 of FIG. 10.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 11:
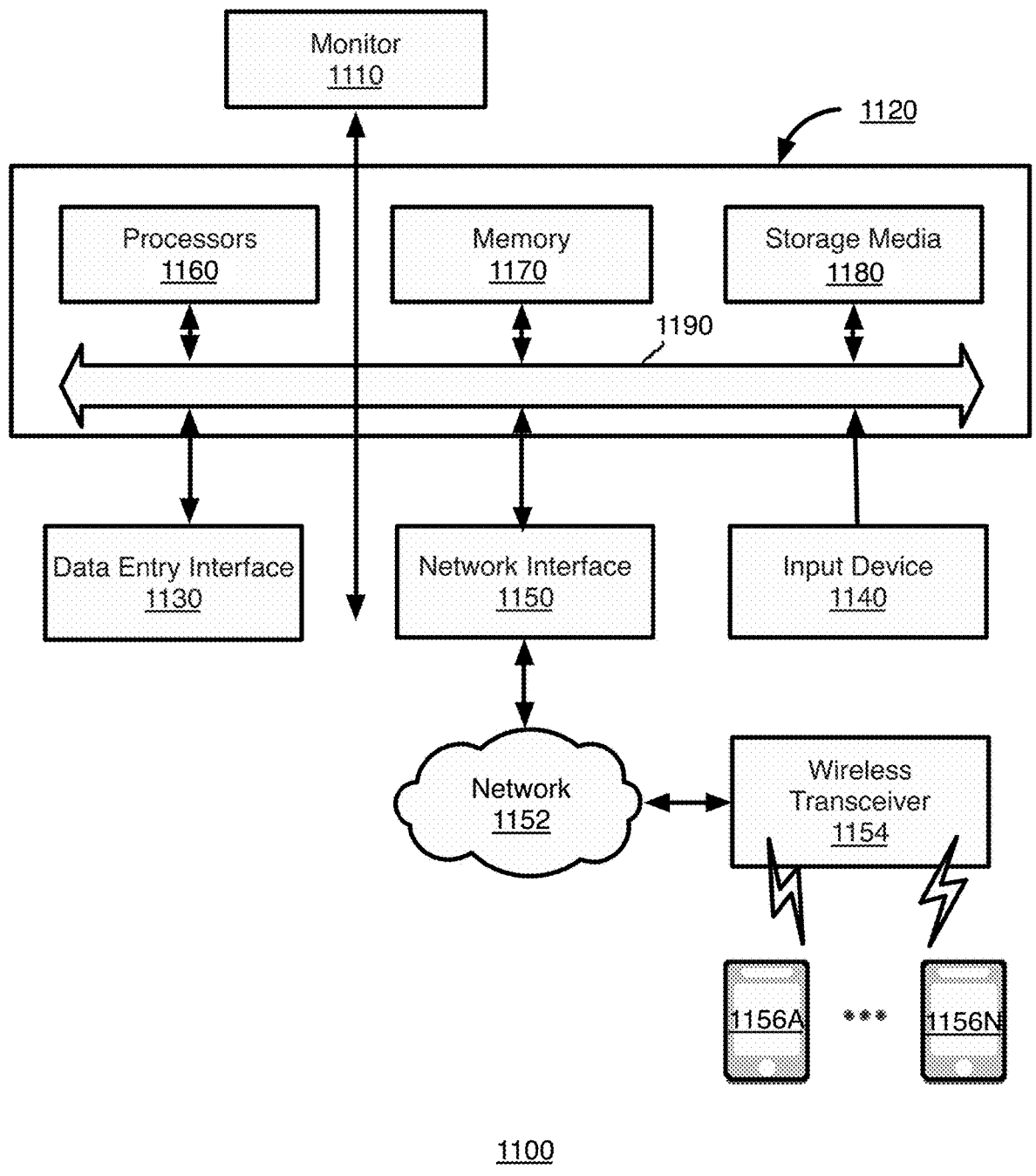
FIG. 11 illustrates an example block diagram of a network environment, which may be used for implementations described herein.

FIG. 11 illustrates an example block diagram of a network environment 1100, which may be used for implementations described herein. Network environment 1100 is merely illustrative and not intended to limit the scope of the claims. One of ordinary skill in the art would recognize other variations, modifications, and alternatives. For example, network environment 1100 may be implemented in a distributed client-server configuration having one or more client devices in communication with one or more server systems.

In one exemplary implementation, network environment 1100 includes a display device such as a monitor 1110, a computer 1120, a data entry interface 1130 such as a keyboard, touch device, and the like, an input device 1140, a network interface 1150, and the like. Input device 1140 is typically implemented as a computer mouse, a trackball, a track pad, wireless remote, tablet, touch screen, and the like. Moreover, input device 1140 typically allows a user to select and operate objects, icons, text, characters, and the like that appear, for example, on the monitor 1110.

Network interface 1150 may include an Ethernet card, a modem (telephone, satellite, cable, integrated services digital network (ISDN), etc.), an (asynchronous) digital subscriber line (DSL) unit, and the like. Furthermore, network interface 1150 may be physically integrated on the motherboard of computer 1120, may be a software program, such as soft DSL, or the like.

Network environment 1100 may also include software that enables communications over communication network 1152 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 1152 may include a local area network, a wide area network, a wireless network, an Intranet, the Internet, a private network, a public network, a switched network, or any other suitable communication network, such as for example cloud networks. Communication network 1152 may include many interconnected computer systems and any suitable communication links such as hardwire links, optical links, satellite or other wireless communications links such as Bluetooth, WIFI, wave propagation links, or any other suitable mechanisms for communication of information. For example, communication network 1152 may communicate to one or more mobile wireless devices 1156A-N, such as mobile phones, tablets, and the like, via a base station such as wireless transceiver 1154.

Computer 1120 may include familiar computer components such as one or more processors 1160, and memory storage devices, such as a memory 1170, e.g., random access memory (RAM), storage media 1180, and system bus 1190 interconnecting the above components. In one embodiment, computer 1120 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1120 performs implementations described herein, in other implementations, any suitable component or combination of components associated with computer 1120 or any suitable processor or processors associated with computer 1120 may facilitate performing the implementations described herein. In various implementations, computer 1100 may not have all of the components shown and/or may have other elements including other types of components instead of, or in addition to, those shown herein.

Memory 1170 and Storage media 1180 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer implemented method for building a representation of an orthogonal path for a business process flow, the method comprising:
   providing a first process node at a first location of a user interface and a second process node at a second location of the user interface, wherein an initial first direction of flow is indicated from the first location of the first process node to a control node at a control location, and an initial second direction of flow is indicated from the control node at the control location to the second process node at the second location;
   repositioning one of: the first location to a relocated first location that is different from the second location, or the second location to a relocated second location that is different from the first location, to achieve:
      a first target flow direction that is opposite of the initial first direction of flow and includes the first process node at the relocated first location to the control node at the control location, or
      a second target flow direction that is opposite of the initial second direction of flow and includes the control node at the control location to the second process node at the relocated second location;
   providing a plurality of stored first indicators that represents the first target flow direction from the first process node to the control node, and a plurality of stored second indicators that represents the second target flow direction from the control node to the second process node, wherein the plurality of stored first indicators and the plurality of stored second indicators include at least one of: a vertical direction indicator or a horizontal direction indicator;
   selecting a first indicator of the plurality of stored first indicators, and a second indicator of the plurality of stored second indicators, to generate an orthogonal line connecting the first process node, the control node, and the second process node, wherein the first process node is at the relocated first location or the second process node is at the relocated second location; and
   generating the orthogonal line on the user interface based on the selected first indicator and the selected second indicator, the orthogonal line representing a direction of flow for a behavior aspect of the business process flow.

2. The computer implemented method of claim 1, wherein selecting the first indicator and the second indicator is to generate the orthogonal line having a least number of line segments.

3. The computer implemented method of claim 1, wherein selecting the first indicator and the second indicator is to generate the orthogonal line having a least number of bends.

4. The computer implemented method of claim 1, wherein the first process node and the second process node each represent one of: a human task process, a system task process, an event process element, or a gateway process element.

5. The computer implemented method of claim 1, wherein the plurality of stored first indicators and the plurality of stored second indicators represent direction vectors stored in at least one table that contains a code and a string for each code, wherein each string contains the directional vectors.

6. A non-transitory computer-readable storage medium carrying program instructions thereon for building a representation of an orthogonal path for a business process flow, the instructions when executed by one or more processors cause the one or more processors to perform:
   providing a first process node in a first location of a user interface and a second process node in a second location of the user interface, wherein an initial first direction of flow is indicated from the first location of the first process node to a control node at a control location, and an initial second direction of flow is indicated from the control node at the control location to the second process node at the second location;
   repositioning one of: the first location to a relocated first location that is different from the second location, or the second location to a relocated second location that is different from the first location, to achieve:
      a first target flow direction that is opposite of the initial first direction of flow and includes the first process node at the relocated first location to the control node at the control location, or
      a second target flow direction that is opposite of the initial second direction of flow and includes the control node at the control location to the second process node at the relocated second location;
   providing a plurality of stored first indicators that represents the first target flow direction from the first process node to the control node, and a plurality of stored second indicators that represents the second target flow direction from the control node to the second process node wherein the plurality of stored first indicators and the plurality of stored second indicators include at least one of: a vertical direction indicator or a horizontal direction indicator;
   selecting a first indicator of the plurality of stored first indicators and a second indicator of the plurality of stored second indicators to generate an orthogonal line connecting the first process node, the control node, and the second process node, wherein the first process node is at the relocated first location or the second process node is at the relocated second location; and
   generating the orthogonal line on the user interface based on the selected first indicator and the selected second indicator, the orthogonal line representing a direction of flow for a behavior aspect of the business process flow.

7. The computer-readable storage medium of claim 6, wherein selecting the first indicator and the second indicator is to generate the orthogonal line having a least number of line segments.

8. The computer-readable storage medium of claim 6, selecting the first indicator and the second indicator is further to generate the orthogonal line having a least number of bends.

9. The computer-readable storage medium of claim 6, wherein the first process node and the second process node each represent one of: a human task process, a system task process, an event process element, or a gateway process element.

10. The computer-readable storage medium of claim 6, wherein the plurality of stored first indicators and the plurality of stored second indicators represent direction vectors stored in at least one table that contains a code and a string for each code, wherein each string contains the directional vectors.

11. An apparatus comprising:
one or more processors; and
logic encoded in one or more non-transitory computer-readable storage media for execution by the one or more processors and when executed, the one or more processors are operable to build a representation of an orthogonal path for a business process flow, by:
  providing a first process node in a first location of a user interface and a second process node in a second location of the user interface, wherein an initial first direction of flow is indicated from the first location of the first process node to a control node at a control location, and an initial second direction of flow is indicated from the control node at the control location to the second process node at the second location;
  repositioning one of: the first location to a relocated first location that is different from the second location, or the second location to a relocated second location that is different from the first location, to achieve:
    a first target flow direction that is opposite of the initial first direction of flow and includes the first process node at the relocated first location to the control node at the control location, or
    a second target flow direction that is opposite of the initial second direction of flow and includes the control node at the control location to the second process node at the relocated second location:
  providing a plurality of stored first indicators that represents the first target flow direction from the first process node to the control node, and a plurality of stored second indicators that represents the second target flow direction from the control node to the second process node,
  wherein the plurality of stored first indicators and the plurality of stored second indicators include at least one of: a vertical direction indicator or a horizontal direction indicator;
  selecting a first indicator of the plurality of stored first indicators and a second indicator of the plurality of stored second indicators to generate an orthogonal line connecting the first process node, the control node, and the second process node and having a least number of line segments, wherein the first process node is at the relocated first location or the second process node is at the relocated second location; and
  generating the orthogonal line on the user interface based on the selected first indicator and the selected second indicator, the orthogonal line representing a direction of flow for a behavior aspect of the business process flow.

12. The apparatus of claim 11, wherein selecting the first indicator and the second indicator is to generate the orthogonal line having a least number of line segments.

13. The apparatus of claim 11, wherein selecting the first indicator and the second indicator is to generate the orthogonal line having a least number of bends.

14. The apparatus of claim 11, wherein the plurality of stored first indicators and the plurality of stored second indicators represent direction vectors stored in at least one table that contains a code and a string for each code, wherein each string contains the directional vectors.

* * * * *

UNITED STATES PATENT AND TRADEMARK OFFICE
CERTIFICATE OF CORRECTION

PATENT NO. : 11,385,868 B2  
APPLICATION NO. : 17/127743  
DATED : July 12, 2022  
INVENTOR(S) : Laplume et al.

It is certified that error appears in the above-identified patent and that said Letters Patent is hereby corrected as shown below:

On the Title Page

Column 1, item (72) under Inventors, Line 3, delete "Ctiy," and insert -- City, --, therefor.

In the Specification

In Column 6, Line 36, delete "System(s)" and insert -- System(s)) --, therefor.

In Column 6, Line 37, delete "System(s)" and insert -- System(s)) --, therefor.

In Column 7, Line 47, delete "Opts," and insert -- Opts,) --, therefor.

In Column 7, Line 61, delete ""System(s),"" and insert -- "System(s)"), --, therefor.

In Column 9, Line 36, delete "features)" and insert -- features)) --, therefor.

In Column 19, Line 21, delete "a indicates" and insert -- indicates --, therefor.

In the Claims

In Column 28, Line 2, in Claim 11, delete "location:" and insert -- location; --, therefor.

Signed and Sealed this  
Twenty-seventh Day of December, 2022

Katherine Kelly Vidal  
*Director of the United States Patent and Trademark Office*